(12) United States Patent
Kerkhof et al.

(10) Patent No.: US 9,027,800 B2
(45) Date of Patent: May 12, 2015

(54) DISPENSING ASSEMBLY

(75) Inventors: Patrick Lambertus Kerkhof, Zoetermeer (NL); Patrick Bernardus Johannes Schneider, Delfgauw (NL); Rui Medeiros Santos, Rotterdam (NL)

(73) Assignee: Vacu Vin Innovations Limited (GI)

( * ) Notice: Subject to any disclaimer, the term of this patent is extended or adjusted under 35 U.S.C. 154(b) by 25 days.

(21) Appl. No.: 13/577,815

(22) PCT Filed: Feb. 8, 2011

(86) PCT No.: PCT/NL2011/050086
§ 371 (c)(1),
(2), (4) Date: Oct. 26, 2012

(87) PCT Pub. No.: WO2011/096814
PCT Pub. Date: Aug. 11, 2011

(65) Prior Publication Data
US 2013/0037560 A1 Feb. 14, 2013

(30) Foreign Application Priority Data

Feb. 8, 2010 (NL) ...................................... 2004211

(51) Int. Cl.
*B65D 47/10* (2006.01)
*A47J 47/01* (2006.01)
*A47G 19/12* (2006.01)
(Continued)

(52) U.S. Cl.
CPC ................. *A47J 47/01* (2013.01); *A47G 19/12* (2013.01); *A47G 19/30* (2013.01); *B65D 47/2081* (2013.01)

(58) Field of Classification Search
CPC .......................................................... A47J 47/02
USPC ......... 222/528, 514, 511, 518, 499, 498, 525, 222/513; 220/475, 780, 783, 309.1, 345.1, 220/350, 351, 305, 796
See application file for complete search history.

(56) References Cited

U.S. PATENT DOCUMENTS 59,687 A * 11/1866 Waldstein et al.
503,708 A * 8/1893 Ross ............................... 211/62
(Continued)

FOREIGN PATENT DOCUMENTS

CN 1338906 A 3/2002
EP 0 636 549 A1 2/1995
(Continued)

OTHER PUBLICATIONS

International Search Report mailed on Jul. 5, 2011 for PCT Patent Application No. PCT/NL2011/050086, 2 pages.

*Primary Examiner* — Kevin P Shaver
*Assistant Examiner* — Michael J Melaragno
(74) *Attorney, Agent, or Firm* — Kilpatrick Townsend & Stockton LLP

(57) ABSTRACT

A dispensing assembly for pourable food or drink products, comprising: a receptacle for accommodating a pourable food or drink product, comprising an opening; and a closure means for closing the opening, comprising a closure member, mounted across the opening, having at least one outlet, and a stop member mounted to confront the outlet, the closure member being resiliently deformable, by the pressing action of a user, from a first condition in which the outlet is spaced from the stop member and the food or drink product may be poured through the outlet to a second condition in which the outlet has been moved inwardly to a position in which it is closed off by the stop member.

15 Claims, 11 Drawing Sheets

(51) Int. Cl.
*A47G 19/30* (2006.01)
*B65D 47/20* (2006.01)

(56) References Cited

U.S. PATENT DOCUMENTS 2,103,684 A * 12/1937 Long .......................... 312/257.1
2,613,010 A * 10/1952 Atkinson ....................... 220/475
2,808,183 A * 10/1957 Olson et al. .................... 222/498
3,321,114 A * 5/1967 Croyle ........................... 222/499
4,602,728 A * 7/1986 Ha ................................ 222/528
5,178,286 A * 1/1993 Allison, III ................. 211/85.23
5,183,179 A * 2/1993 Morris, Sr. .................... 220/694
5,487,486 A * 1/1996 Meneo .......................... 220/504
D389,403 S * 1/1998 Rahr .............................. D9/428
5,960,987 A * 10/1999 Solland et al. ................. 220/834
6,749,092 B2 * 6/2004 Olechowski et al. .......... 222/514

FOREIGN PATENT DOCUMENTS

| EP | 1 147 994 A1 | 10/2001 |
| JP | H01-100737 U | 4/1989 |
| JP | H02-135467 U | 11/1990 |
| JP | 2004315088 A | 11/2004 |
| JP | 2006016012 A | 1/2006 |
| WO | 03/014005 A1 | 2/2003 |
| WO | 2008/059236 A1 | 5/2008 |

* cited by examiner

DISPENSING ASSEMBLY

This application is the National Phase of International Application No. PCT/NL2011/050086, filed Feb. 8, 2011, which claims priority to the Netherlands Patent Application No. 2004211, filed Feb. 8, 2010, the disclosures of which are incorporated by reference herein.

The present invention relates to a dispensing assembly for pourable food or drink products.

The packaging of food and drink products is generally designed primarily to meet the requirements of (i) promoting the sale of the product at the point of sale, and (ii) protecting or preserving the product prior to sale. When the product is not consumed in one sitting and discarded, for example, in the case of a product that tends to be consumed in small doses, the continued use of the original packaging is sometimes not desired by the consumer. This may be for the practical reason that the opened packaging does not lend itself to readily being used in a manner which continues to protect or preserve the product, or it may be for the aesthetic reason that the branding on the packaging does not match the environment in which the product is to be consumed. Accordingly, it is known to use some form of dispensing assembly.

US 2008/0190933 discloses a closure device for a container for preserving foodstuff that is packed in the container. The closure device takes the form of a one-piece insert having a lower/inner layer structure which defines a main outlet and an upper/outer layer structure that includes a stop. The closure device is deformable such that the stop can be made to descend into the main outlet, thereby closing it off. A drawback is that the closure device is relatively complex to manufacture comprising as it does have more than one layer. Another drawback is that food may remain on the lower/inner layer structure after pouring, thereby not providing a clean closure of the container.

EP 1 147 994 discloses a closure cap for a drink bottle comprising an outer element and an inner element displaceable to each other for opening and closing an outlet in the outer element. The outer element has a rigid spout connected to a rigid skirt via a flexible ring.

WO 03/014005 discloses a dispensing valve for a drink bottle comprising a closure body and a valve member having a deformable portion including a first hinge region and a second hinge region.

A drawback of the above mentioned closure caps is that they are mainly rigid while having a flexible hinge, making the closure cap relatively difficult to operate by a user and making the closure cap relatively vulnerable to failure.

The present invention aims to provide a closure solution that tackles at least these drawbacks.

According to a first aspect, the present invention may provide a dispensing assembly for food or drink products, comprising: a receptacle for accommodating a food or drink product, comprising an opening; and a closure means for closing the opening, mounted across the opening, comprising a closure member having an outlet, and a stop member mounted to confront the outlet, the closure member being resiliently deformable, wherein the closure member is adjustable, by the pressing action of a user, from a first condition in which the outlet is open by being spaced from the stop member to allow the food or drink product to pass through the outlet to a second condition in which the outlet has been moved inwardly to a position in which it is closed off by the stop member.

The present invention thus provides a dispensing assembly in which it is the outlet that the user, by his pressing action, causes to move inwardly towards the stop member from a first condition in which the outlet is open towards a second condition in which the outlet is closed off by the stop member. Such an arrangement enables the fixed mechanical structure providing or supporting the stop member to be disposed inwardly of the outlet such that it does not interfere with the passage of the food or drink that has exited the outlet during pouring.

The closure member comprises at least one outlet. The closure member may comprise a single outlet, or may comprise multiple outlets. The multiple outlets may be adjustable independently of each other between the first condition and the second condition. The multiple outlets may also be adjustable together from the first condition to the second condition.

Since the closure member is resiliently deformable, the closure member can be pressed from the first condition to the second condition in a free way. There is no pre-defined deformation line or pressing direction. This is contrary to the prior art in which a predefined deformation line is provided along which the cap can be pressed in. If for such a prior art cap, the pressure is not applied in the predefined direction, the cap cannot be pressed in. According to the invention, the closure member can be pressed from the first condition to the second condition more or less independent of the direction in which the pressure is applied, due to the closure member being resiliently deformable.

The closure member can for example be entirely manufactured from a resiliently deformable material to allow for optimal flexibility of the closure member.

Due to the flexibility of the closure member, the closure member can also be pressed in an intermediate condition, a position between the first condition and the second condition. In the intermediate condition, the outlet is partly moved towards the stop member wherein the outlet is partly closed off by the stop member. Thus a smaller outflow opening can be obtained as compared to the outflow opening in the second condition. In the intermediate condition, the closure member is in fact in an oblique position with respect to the first condition or the second condition. Due to the resiliently deformable closure member, and thus the absence of a predetermined deformation line, the outlet can be pressed towards the second condition as far as the user determines. There is no predetermined end position defined for the second condition.

By providing a resiliently deformable closure member, the content of the receptacle may be contained air-tight or approximately air-tight. The user usually presses the closure member a bit too far down towards the second condition, this may result in a slight overpressure in the receptacle. Air may escape the receptacle e.g. between the closure means and an edge of the receptacle. Due to the resiliently deformable closure member, the closure member was a bit round due to the overpressure, but by escaping of some air, the closure member becomes a bit 'sucked in' resulting in a slight underpressure in the receptacle. The receptacle may thus be closed off air-tight or approximately air tight, so the content of the receptacle may be kept fresh longer. During certain experiments barely no aging of fresh content of the receptacle was observed.

The stop member may form part of a stop member assembly that is fittable to the receptacle. The stop member assembly can be a separate part that is removable fittable to the receptacle, but it may also be integrated in the closure means or in the receptacle.

For example, the stop member assembly may comprise a framework for suspending the stop member. The framework may comprise ribs or a sieve plate or a plate patterned with holes etc. Many variants of the framework may be possible. The framework may be removable fittable to the receptacle or may be integrated to the receptacle or to the closure means.

Alternatively, the stop member assembly may comprise a pillar as a stop member that projects upwardly from a base of the receptacle. The pillar may be suspended by a framework that can be removable fitted to the receptacle, e.g. to the base of the receptacle. The pillar may also be integrated in the base or the bottom or the side wall of the receptacle or the pillar may extend from an insert piece in the receptacle. Preferably, the pillar has a larger cross-section at the bottom than at the top. The pillar may have a circular or oval cross-section or a polygonal cross-section or variants and/or combinations thereof. Also the cross-section of the pillar may vary in upward direction. The cross-section of the outlet preferably approximately corresponds with the cross-section of at least the upper part of the pillar to provide for an opening in the first condition and a closure in the second condition. The pillar may be integrated to the receptacle or may be removable coupled to the receptacle.

With a stop member assembly that may be removable fitted to the receptacle, various types of use and/or application of the receptacle may be possible. For example, the assembly may be used as a cocktail shaker, or a sugar container or a drink container etc. By providing different types of stop member assemblies and in particular, different types of frameworks suspending the stop member, many uses and/or variants of the dispensing assembly may be possible. By interchanging a single part, the user can arrange the receptacle and closure means for various uses.

By providing a stop member and/or a stop member assembly that is integrated to the receptacle and/or to the closure means, the dispensing assembly may be relatively cost effective and/or the receptacle and/or closure means may be relatively simple and cost effectively manufactured.

Advantageously, when the pillar stop member is integrated to the receptacle, the pillar may be arranged hollow to cooperate with a holder, e.g. with a holder arm that can be received in the hollow pillar. So, a relatively simple holder system may be provided that can cooperate with the receptacles of the dispensing assembly to provide simple and reliable storage for the dispensing assembly, e.g. in a home kitchen.

The outlet of the closure means may be provided with a flange engagement with the stop member. By providing a flange, variations in diameter and/or cross-section of the stop member can be easily overcome, also in view of the random pressure force applied by the user and the non-predetermined deformation zone. The position of the closure member onto the stop member in the second condition is not predictable, and providing a flange may overcome variations in position, diameter and/or cross-section of the stop member in the second condition.

According to a second aspect, the present invention may provide a closure means for closing the opening of a receptacle for storing food or drink products. According to a third aspect of the invention, the present invention may provide a kit of parts of a receptacle and of a closure means.

Further preferred features of the present invention are defined in the dependent claims.

In the context of the present invention, the term "food" is to be construed broadly so as to encompass not only a product that is immediately eaten but also more generally comestible items that are used in the preparation of a food product. The term "drink" is to be construed in a similarly broad manner.

Exemplary embodiments of the present invention are hereinafter described with reference to the accompanying drawings, in which:

FIG. 1(a) shows a perspective view of a first embodiment of a dispensing assembly according to the invention and FIG. 1(b) shows a perspective view of a cross-section of the first embodiment of the dispensing assembly of FIG. 1(b);

FIGS. 2(a), 2(b) show cross-sectional views of the first embodiment of the dispensing assembly in the first and second conditions, respectively;

FIG. 3 shows a perspective view of a cross-section of a second embodiment of a dispensing assembly according to the invention;

FIGS. 4(a), 4(b) show cross-sectional views of the second embodiment of the dispensing assembly in the first and second conditions; respectively;

FIGS. 5(a), 5(b) show side views of a third embodiment of a dispensing assembly according to the invention in the first and second conditions, respectively;

FIGS. 6(a), 6(b) show cross-sectional views of the third embodiment of the dispensing assembly taken along the lines A-A and B-B of FIG. 5, respectively;

FIG. 7 shows a view from above on the third embodiment of the dispensing assembly;

FIGS. 8(a), 8(b) show schematic perspective views of a dispensing assembly according to the invention with the closure member in the intermediate condition;

Throughout this description the same or corresponding parts have been given the same or corresponding reference numbers.

Figure 1A:
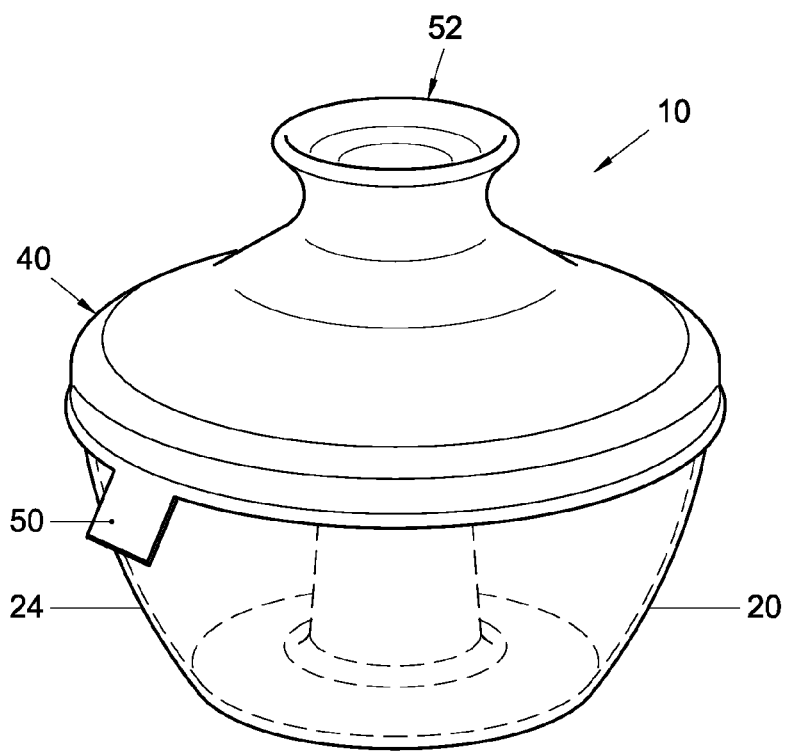
Figure 1B:
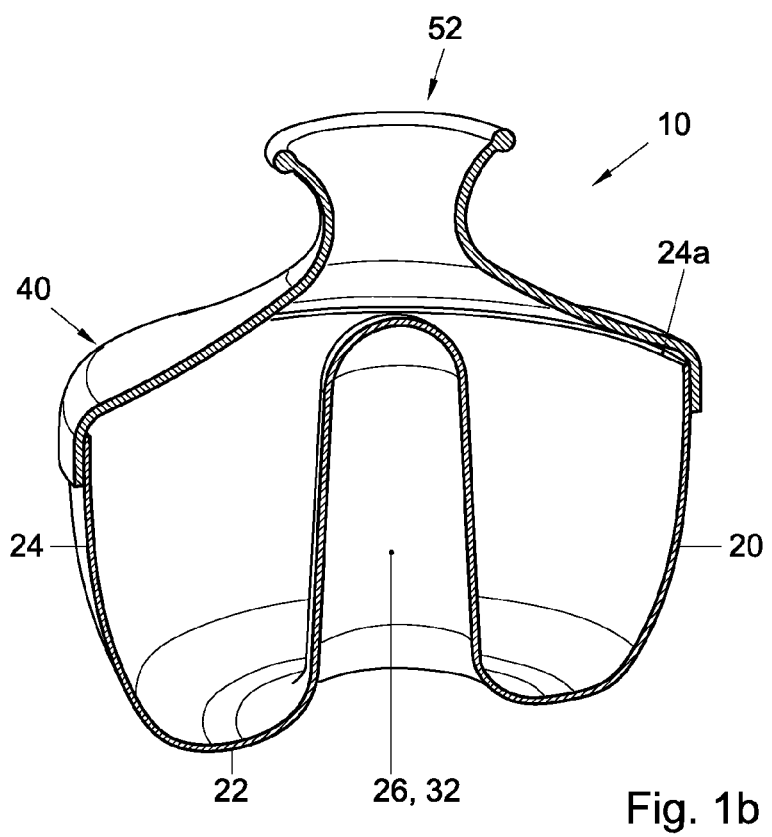

Referring to FIGS. 1(a), 1(b), a first dispensing bowl assembly suitable for dispensing small snacks such as nuts or the like is shown and generally designated 10. The assembly 10 is in this embodiment sized such that it can be readily held and manipulated using, preferably, just one hand, but certainly using both hands. The assembly 10 can also be sized relatively small, e.g. to hold herbs, or can be sized relatively large, e.g. to hold pasta. Various sizes are possible.

The assembly 10 comprises a receptacle 20, here bowl 20, for accommodating the snacks. The bowl 20 is made from glass or a rigid plastics material such as, for example, silicone or TPE. The bowl 20 comprises a base 22 and a circumferential, outer wall 24 defining the upper opening of the bowl 20. The top portion of the wall, and thus the rim of the bowl, is designated 24a. The bowl 20 further comprises as a stop member 32, an integrally-formed pillar 26 which projects upwardly from the centre of the base 22 gently inwardly tapering and terminating at a rounded distal-end portion 28 that in this embodiment extends slightly above the height of the rim 24a. The distal end portion of the pillar 26 may be provided as a blunt end, but may also be provided as an open end.

Figure 2A:
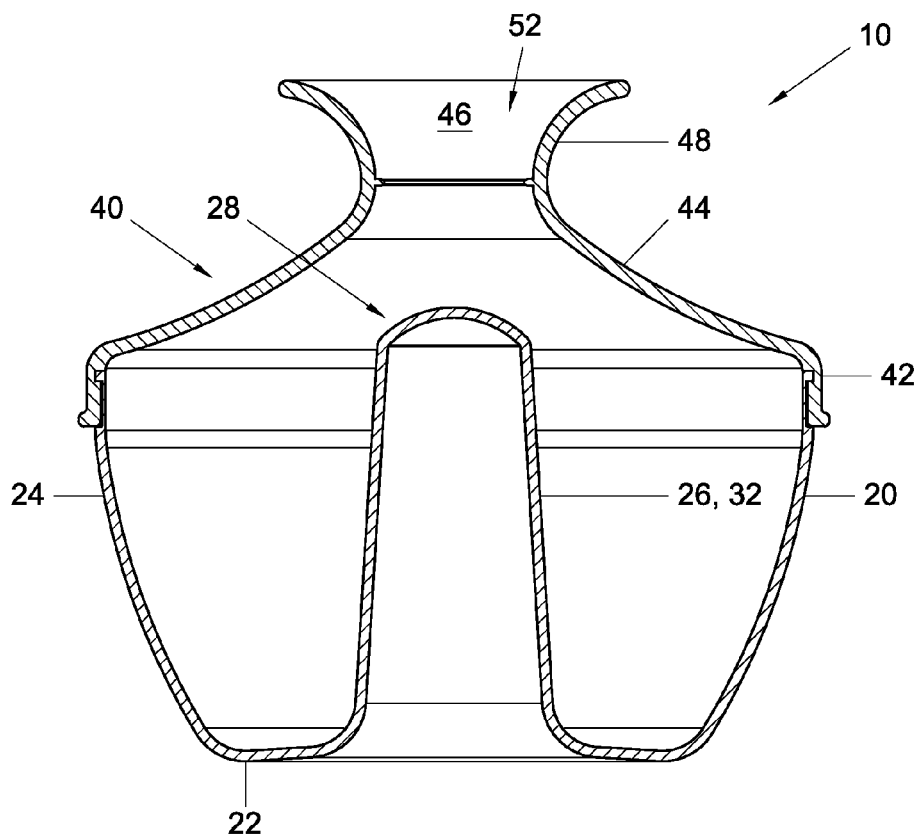

Referring to FIG. 2(a), the assembly 10 further comprises a one-piece closure member 40 made from rubber or a flexible plastics material. The closure member 40 comprises an outlet 52, here defined by an outlet channel 46. The closure member 40 comprises an annular wall portion 42, a tapering wall portion 44 of generally the shape of the surface of a cone that tapers inwardly from the annular wall portion 42 to an outlet channel 46 defined by a channel wall portion 48. The annular wall portion 42 is sized to fit around the rim 24a of the bowl 20 in an approximately air-tight sealing engagement, whereby the closure member 40 may be attached to the bowl 20 as shown in FIGS. 1(*a*), (*b*). As depicted in FIGS. 1(*a*), (b), 2(*a*) the closure member 40 is in substantially its natural condition, being the first condition. It will be appreciated that, in the strictest sense, it may not be perfectly in its natural condition, since there may be some localized stretching of the closure member 40 at the annular wall portion 42 and neighbouring sections of the tapering wall portion 44 in order to ensure the above-mentioned sealing engagement. In order to assist the user with attaching the closure member 40 to the bowl 20, the closure member 40 further comprises a tab 50 by means of which the user can readily apply any necessary stretching forces during attachment. With the closure member 40 the substantially natural condition of FIGS. 1(*a*), (*b*), 2(*a*) the assembly 10 is in an open position, the opening between inside and outside of the assembly 10 being provided by the outlet channel 46.

Figure 2B:
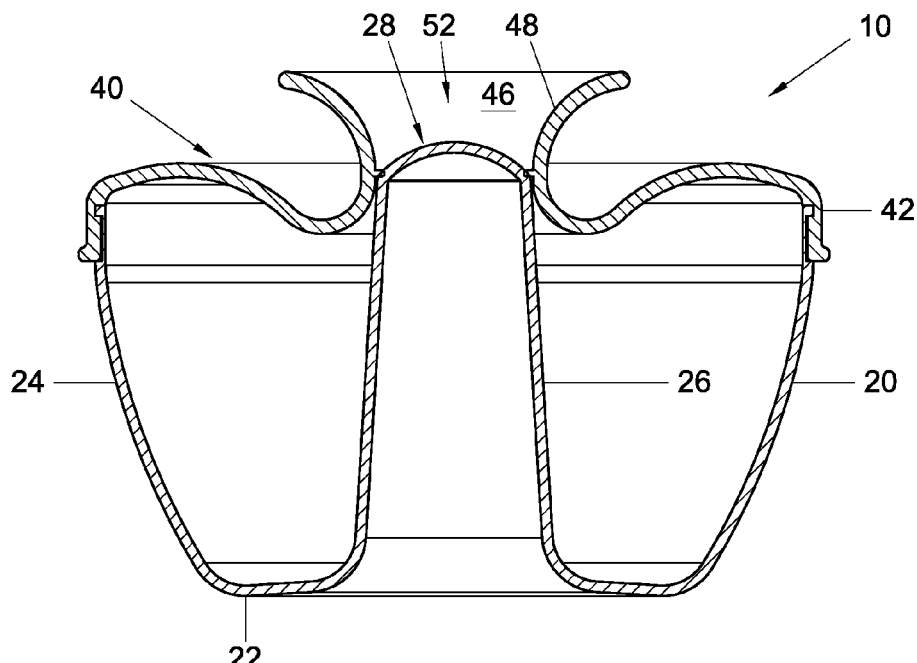

The material of the closure member 40 is elastic such that it deforms in a resilient manner. Depressing the closure member 40 for example via the channel wall portion 48 causes the closure member 40, and specifically the tapering wall portion 44, to deform by buckling, whereby the outlet channel 46 is displaced downwardly expelling excess air there through as it travels until the position in FIG. 2(*b*) is reached, in which the distal-end portion 28 of the pillar 26 has penetrated into the outlet channel 46 sealing it off in an air-tight manner. The gradually tapering nature of the pillar 26 provides increasing resistance to the user preventing or at least discouraging over-depressing of the closure member 40, also no exact end position is defined for the closure member 40 in the second position engaging the stop member. With the pillar 26 blocking off the outlet channel 46, the assembly 10 is in its closed position. The engagement between the channel wall portion 48 and the pillar 26, both in terms of the frictional forces between the surfaces of the channel wall portion 48 and the pillar 26, and the gripping forces applied to the pillar 26 by the channel wall portion 48, is such that, upon removal of the depressing force applied by the user, the closure member 40 is held fast in the deformed condition and thus the assembly 10 locked in its closed condition.

In order to unlock the assembly 10, the user pulls the closure member 40 for example via its channel wall portions 48. The pulling action overcomes the above-mentioned frictional and gripping forces between the channel wall portion 48 and the pillar 26 releasing the closure member 40 to return to the first condition and thus the assembly 10 to its open position as shown in FIG. 2(*a*).

The outwardly flaring nature of the channel wall portion 48 as shown in the drawings is advantageous when unlocking the assembly 10 since the flared wall portion is easy for the user to take hold of. Further, when locking the assembly 10, the flared wall portion serves to distribute the applied force widely over the surface of closure member 40. It will be appreciated that the shape of the flared wall portion will also have a bearing on the travel of the snacks as they are poured and so the shape will be designed with that further consideration in mind.

The rounded end of the distal-end portion 28 of the pillar 26 encourages the closure member 40 to finally adopt the intended FIG. 2(*b*) position even if the depressing force applied by the user is some way from the desired vertical direction.

In a further embodiment of the first dispensing bowl assembly 10, the characteristics of the closure member 40 and its shape may be selected such that the deformed condition that it adopts when the assembly 10 assumes its closed position is at or near to a secondary stable condition in which the forces coming from the resilience of the material are in equilibrium, whereby the above-mentioned gripping and frictional forces required to seal off the outlet channel 46 may be less, since the engagement between the channel wall portion 48 and the pillar serves only to provide a seal and not to restrain the closure member 40 from returning to its natural condition.

In use, the first dispensing assembly bowl 10 is used as follows. With the closure member 40 removed, the bowl 20 is loaded with the food such as small snacks. Because of the presence of the pillar 26, only the region around the pillar 26 is available for snacks. The closure member 40 is then attached to the bowl 20, as described above, creating an air-tight seal at the rim 24*a* of the bowl 20. In order to preserve the freshness of the snacks, the closure member 40 is depressed by the user causing the assembly 10 to move from its FIG. 2(*a*) open position to its FIG. 2(*b*) closed position, thereby creating a further air-tight seal between the pillar 26 and the closure member 40 and wholly isolating the snacks from the ambient air. When the user wishes to dispense some snacks, he pulls on the channel wall portion 48 causing the assembly 10 to move to its open FIG. 2(*a*) position and then holding the bowl 20 in his hand(s) tilts the assembly as necessary to pour the desired amount of snack items from the assembly. With the snack items thus dispensed, the assembly 10 is then re-closed by, once again, depressing the closure member 40.

Figure 3:
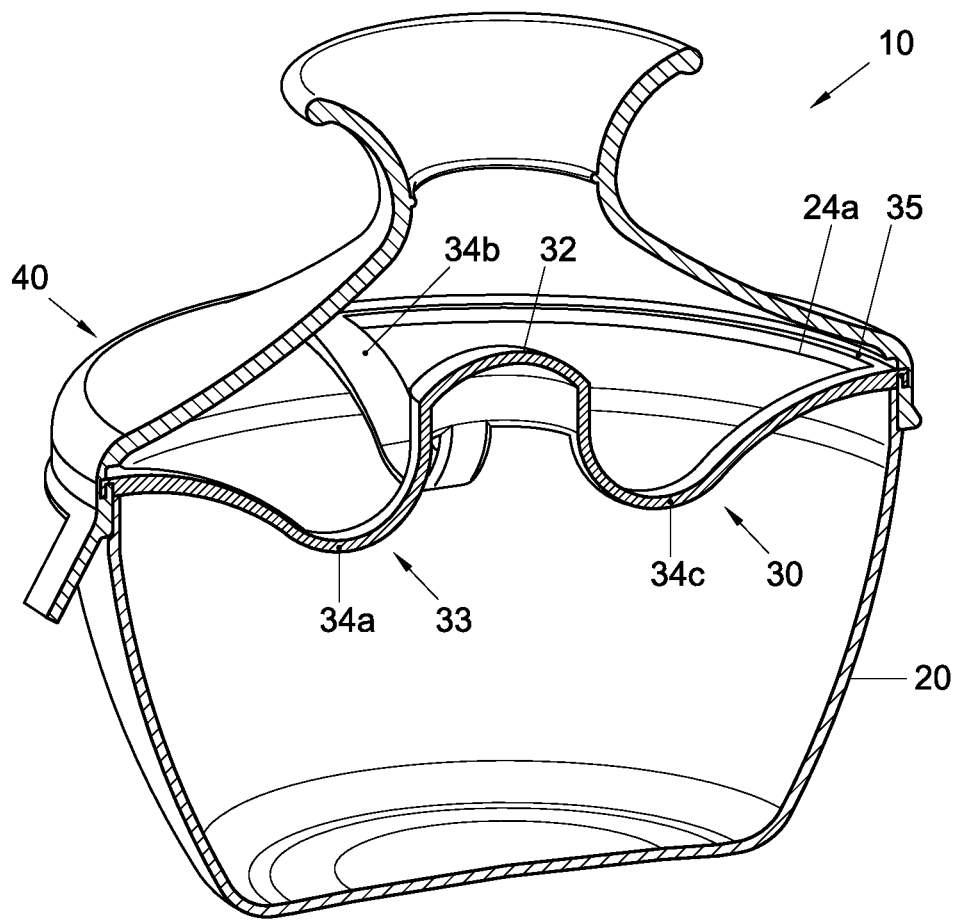
Figure 4A:
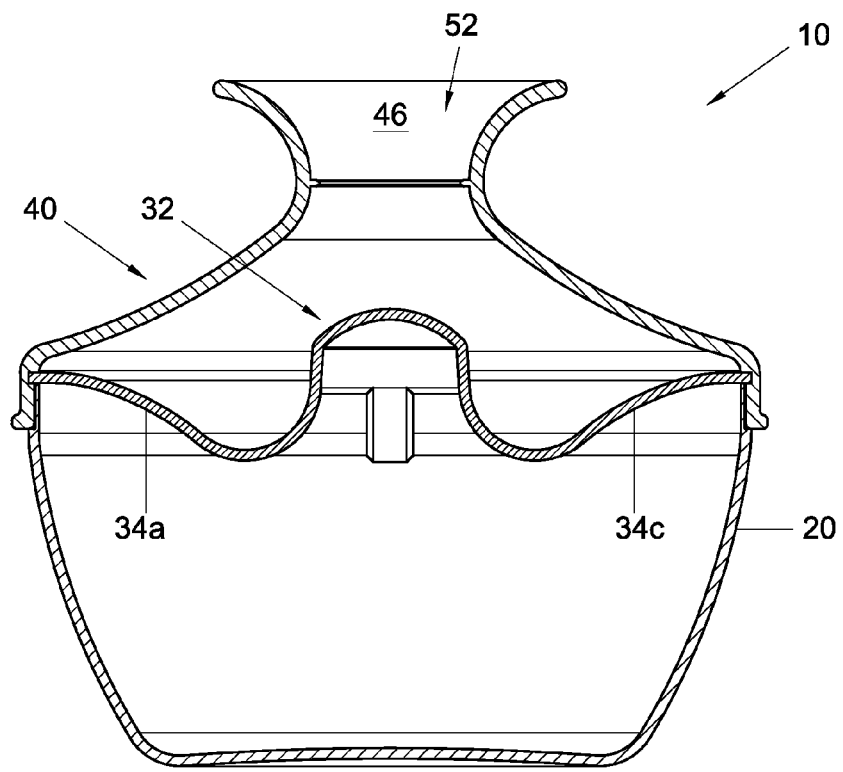
Figure 4B:
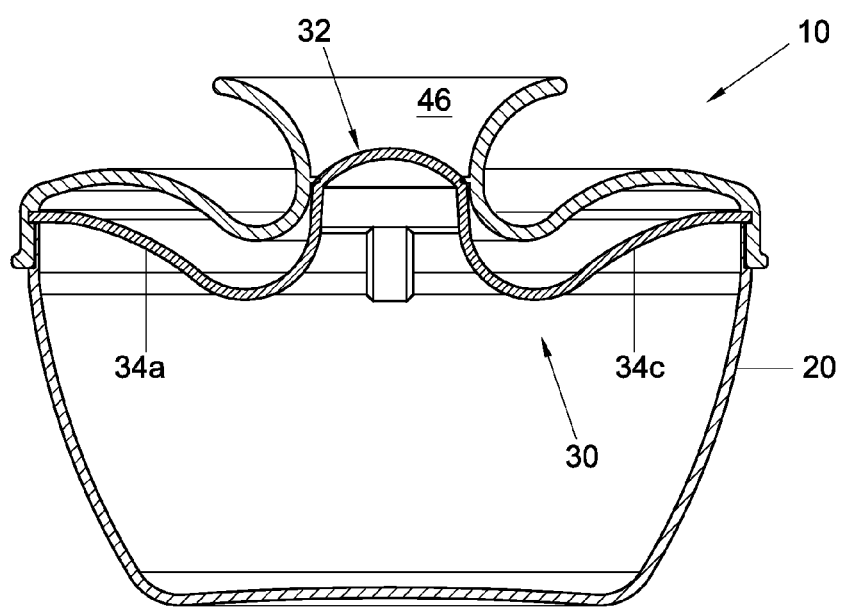

A second dispensing bowl assembly 10 is shown in FIGS. 3, 4(*a*), (b). The second dispensing bowl assembly is identical in construction and use to the first dispensing bowl assembly except that the pillar 26 has been replaced by a suspended stop member assembly 30. The stop member assembly 30 comprises a stop member 32 which is suspended in position below the outlet channel 46 by a supporting framework 33. The supporting framework 33 comprises four curved radial limbs 34*a-d* (only *a-c* being visible in the drawings) that each connect to a circumferential rail 35. In other embodiments, the supporting framework 33 may comprise a different number of limbs, for example, two limbs. The stop member 32, limbs 34*a-d*, and rail 35 form in this embodiment part of a one-piece plastic insert. The insert 30 is removable fitted to the bowl 20 as shown with the rail 35 being held in place on the rim 24*a* by the closure member 40. In use, the stop member 32 performs the same role as the distal-end portion 28 of the pillar 26 in sealing off the outlet channel 46 as shown in FIGS. 4(*a*), (*b*). The second dispensing bowl assembly 10 is advantageous in that the insert 30 enables the closure member 40 to be used with a standard design of bowl 20, i.e. a bowl 20 that does not include a special pillar 26. Furthermore, avoiding the use of the pillar 26 frees up more storage for the snacks within the bowl 20.

Figure 5A:
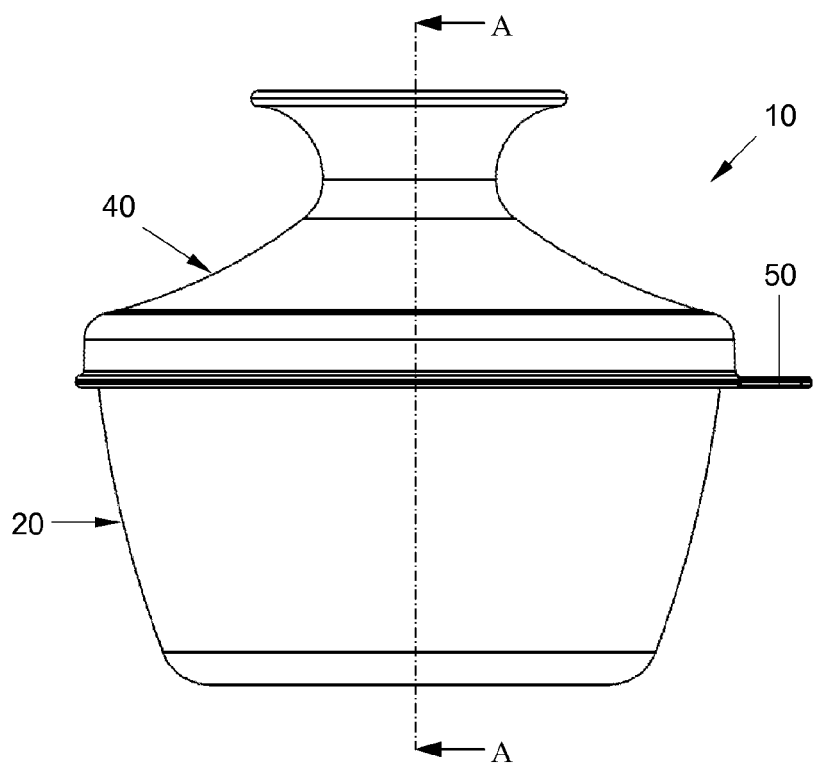
Figure 5B:
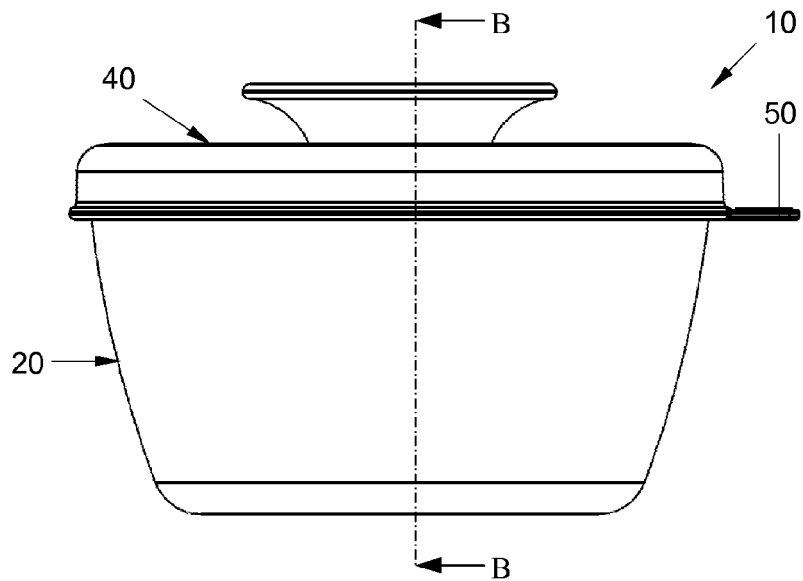
Figure 6A:
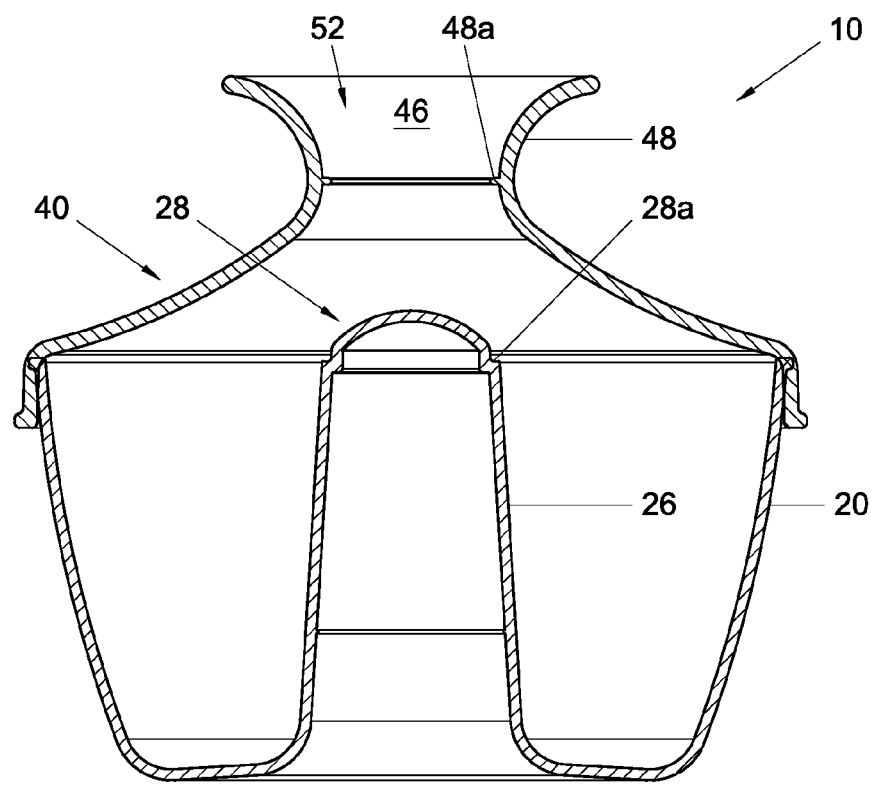
Figure 6B:
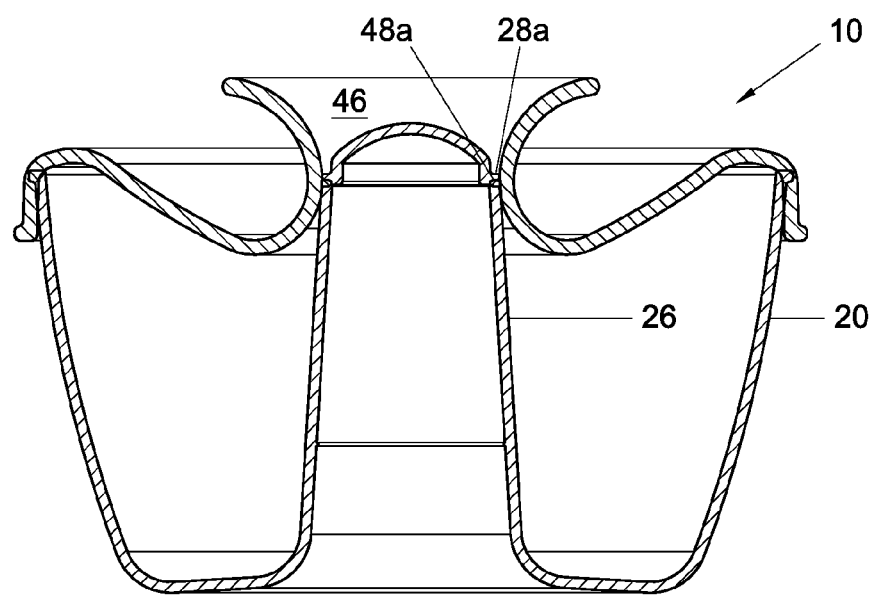
Figure 7:
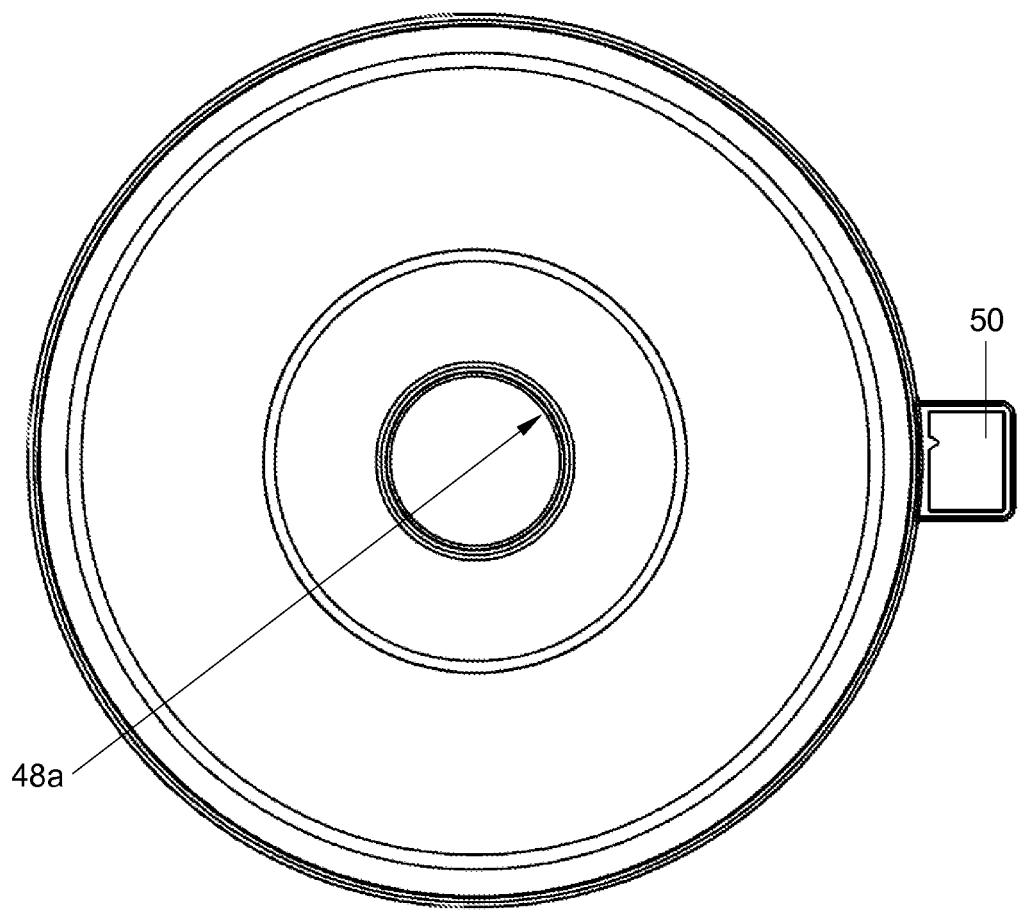

A third dispensing bowl assembly 10 is shown in FIGS. 5(*a*), (*b*), 6(*a*), (*b*), 7. The third dispensing bowl assembly is identical in construction and use to the first dispensing bowl assembly except that the distal-end portion 28 of the pillar 26 is provided with a shoulder 28*a* and the channel wall portion 48 is provided with an annular flange 48*a*. When the closure member 40 is depressed, it is deformed from its first condition as shown in FIG. 6(*a*) to a deformed condition as shown in FIG. 6(*b*). It will be noted that in the FIG. 6(*b*) condition the flange 48*a* has come to rest on the shoulder 28*a*. The engagement of the flange 48*a* and the shoulder 28*a* serves to promote a tight seal between the pillar 26 and the closure member 40.

Similar means for promoting a tight seal can be used, adapted mutatis mutandis, with the second dispensing bowl assembly.

The above-described preferred embodiments have been described in use dispensing snacks such as peanuts. However, they may also be used for, for example, food products such as flour, sugar, spices, and other like food products of increasing dimension that may still be poured, and also drinks.

In the above-described preferred embodiments, the closure member 40 comprises one piece of elastic material. In other embodiments, the closure member 40 may comprise an elastic section, for example, the tapering wall portion 44, and another rigid section(s), for example, the channel wall portion 48 and/or the annular wall portion 42. In the case that the annular wall portion 42 is rigid, it is preferably screwable onto the rim 24*a*.

Figure 8A:
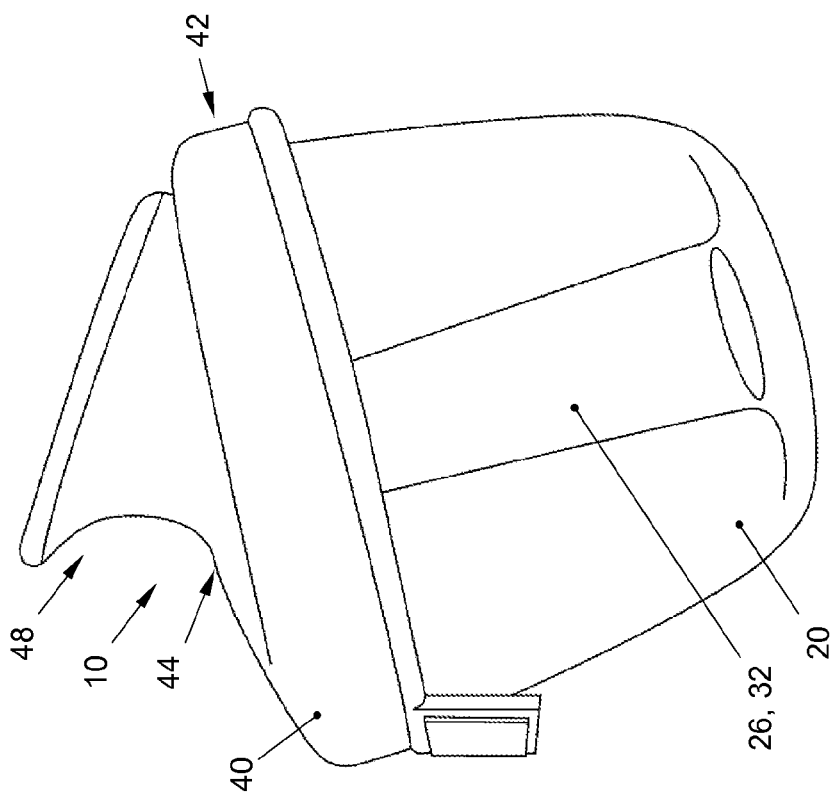
Figure 8B:
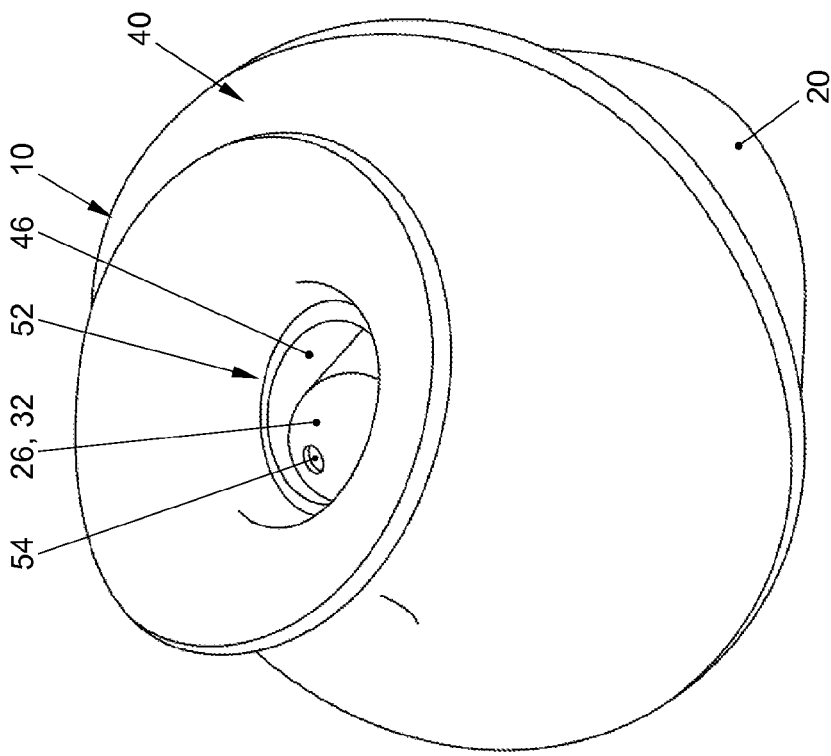

FIG. 8*a* and FIG. 8*b* show the dispenser assembly 10 wherein the closure member 40 is in the intermediate condition. The intermediate condition is a condition in which the closure member 40 is inbetween the first condition, as shown e.g. in FIG. 1, FIG. 2*a*, FIG. 3, FIG. 4*a*, FIG. 5*a* or FIG. 6*a*, and the second condition as shown e.g. in FIG. 2*b*, FIG. 4*b*, FIG. 5*b* or FIG. 6*b*. In the intermediate position, the outlet 52 is partially open, as can be seen in FIG. 8*a*. The outlet channel 46 is partly closed off by the stop member 32. In the intermediate condition is a smaller outflow opening is provided than in the first condition.

Since the closure member 40 is resiliently deformable, the pressing direction of the user is not predetermined. The user can depress the closure member 40 rather randomly from the first condition towards the second condition or towards an intermediate condition. Also, the intermediate condition is not a predefined condition, but the extent to which the outlet is partially closed off by the stop member 32 is determined by the user's pressure action.

In FIG. 8*a* and FIG. 8*b* it can be seen that there is no predetermined deformation line, contrary to the prior art. Although the whole closure member 40 is resiliently deformable, also the annular wall portion 42 and the channel wall portion 48 are resiliently deformable, it is mainly the tapering wall portion 44 that deforms during pressing from the first condition to the intermediate condition and/or the second condition. In the tapering wall portion 44, there is no predefined deformation line and the closure member 40 or the tapering wall portion 44 can deform approximately randomly.

As can be seen in FIG. 8*a*, the stop member 32 is provided with a hole 54. Advantageously, through the hole 54 fluid assembled in the pillar 26, e.g. during dishwashing, can leak out of the pillar 26 when the receptacle 20 is placed upside down, e.g. for drying.

Figure 9:
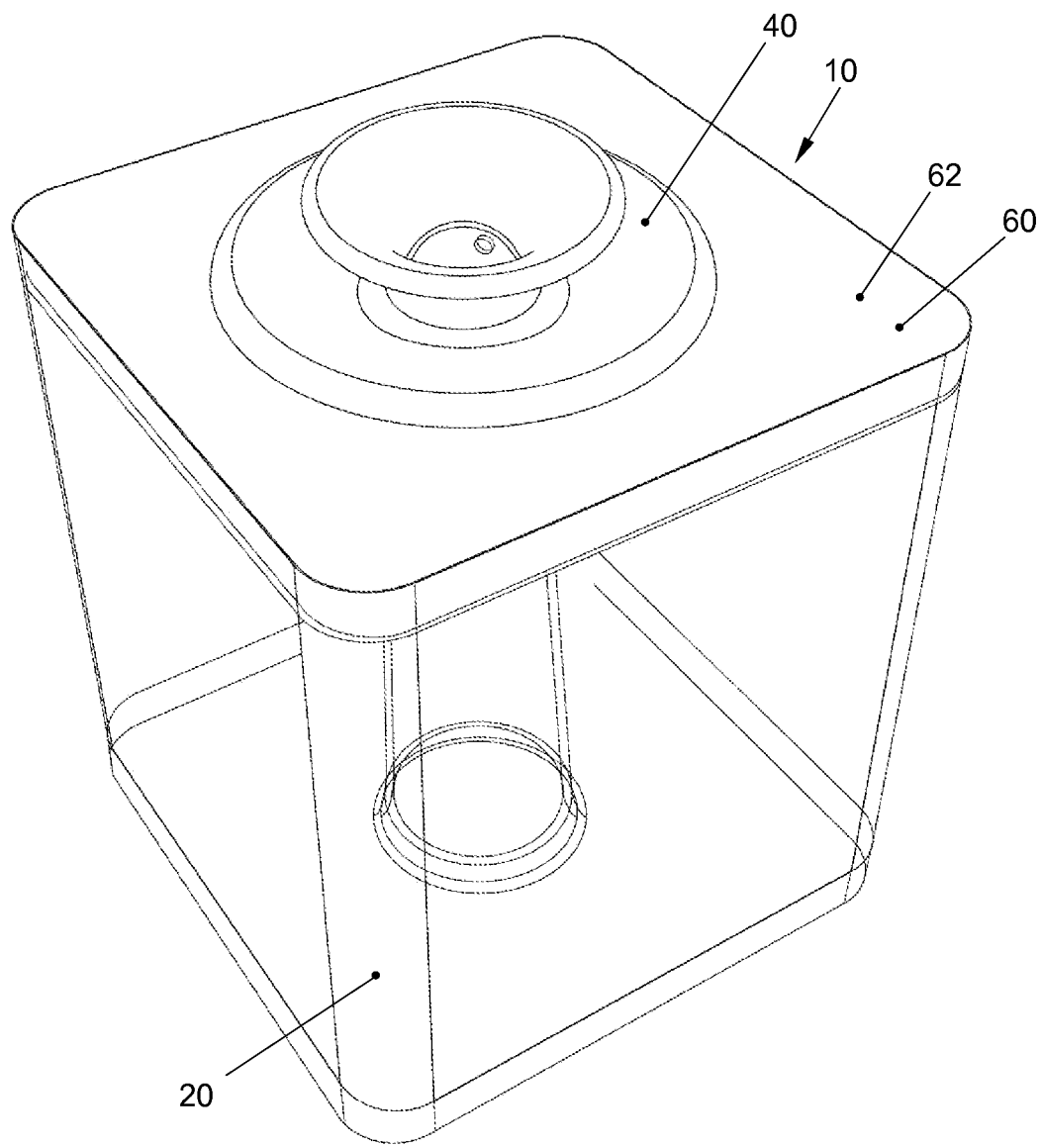
FIG. 9 shows a schematic perspective view of a fourth embodiment of a dispensing assembly according to the invention.

FIG. 9 shows a fourth embodiment of the dispensing assembly 10 according to the invention. In this embodiment, the closure member 40 is comprised in a closure means 60. In the previous embodiments shown, the closure means 60 comprising the closure member 40 are the same. Here, the closure means 60 comprises the closure member 40 and a closure part 62 arranged around the closure member 40. Here a single closure member 40 is comprised in the closure means 60, but the closure means 60 may comprise multiple closure members 40. Each closure member 40 may function similarly as described before.

Figure 10:
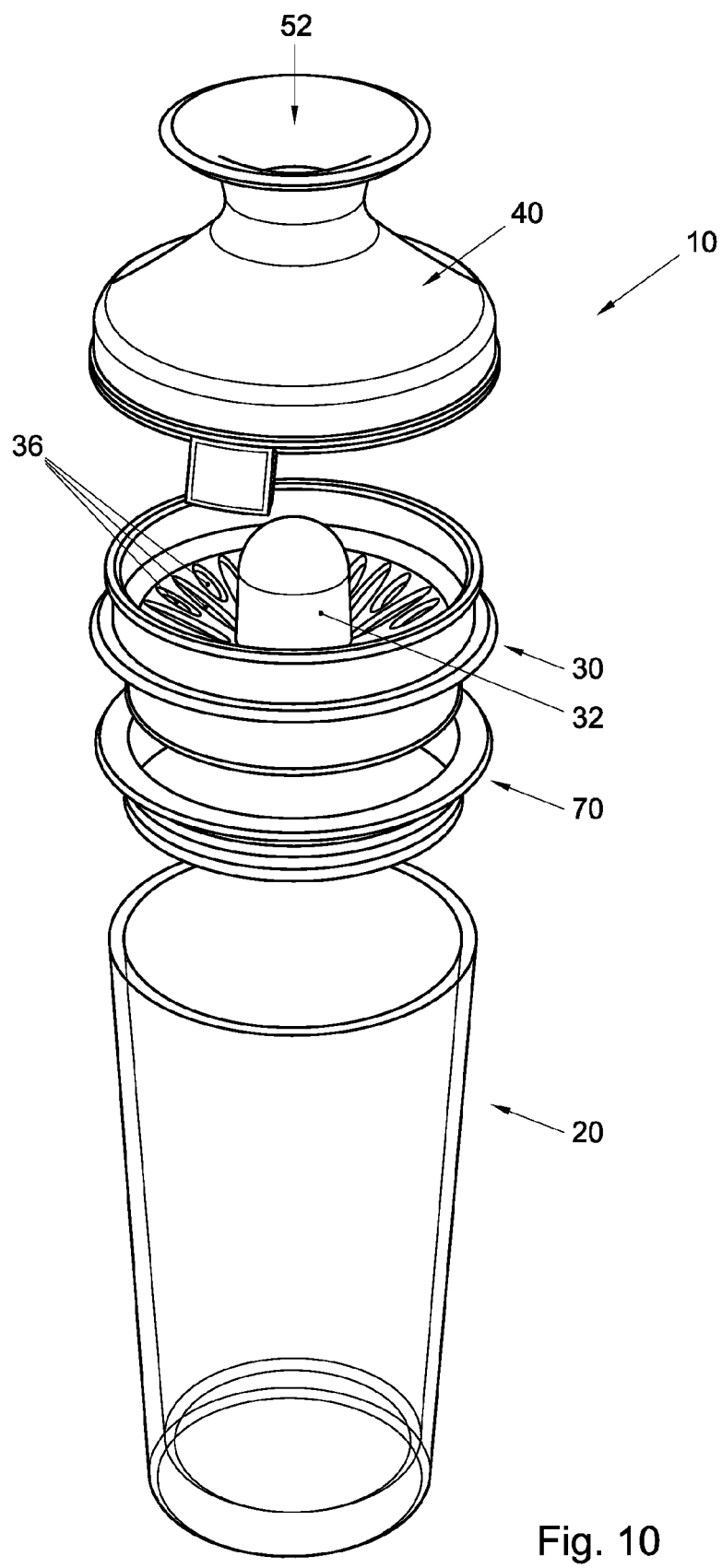
FIG. 10 shows a schematic perspective view of a fifth embodiment of a dispensing assembly according to the invention.

FIG. 10 shows a fifth embodiment of a dispensing assembly 10 according to the invention. Here, the stop member 32 forms part of a stop member assembly 30 suspended on the receptacle 20. In this embodiment, a seal ring 70 is placed between the suspended stop member assembly 30 and the receptacle 20 to prevent leakage of e.g. fluid. The embodiment shown in FIG. 10 can advantageously be used as for example a cocktail shaker. The suspended stop member assembly 30 is here provided with apertures 36 through which fluid can flow. For use as e.g. a cocktail shaker, all ingredients can be poured in the receptacle 20. Then, the seal ring 70, the stop member assembly 30 and the closure member 40 can be arranged on the receptacle 20 to provide for a dispensing assembly 10. The flexible closure member 40 can be pressed towards the second condition in which the outlet 52 is closed off by the stop member 32. In the closed position of the outlet 52, the ingredients in the shaker can be shaken. When ready, the closure member 40 can be returned to the first position to open the outlet 52 and the fluid can be poured through the apertures 36 and the outlet 52. The apertures 36 also can function as a sieve to prevent larger solid ingredients from being poured out. The stop member assembly 30 can also comprise a sieve. Various embodiments of the stop member assembly can be provided and various applications of a dispensing assembly comprising such a stop member assembly can be possible.

Figure 12:
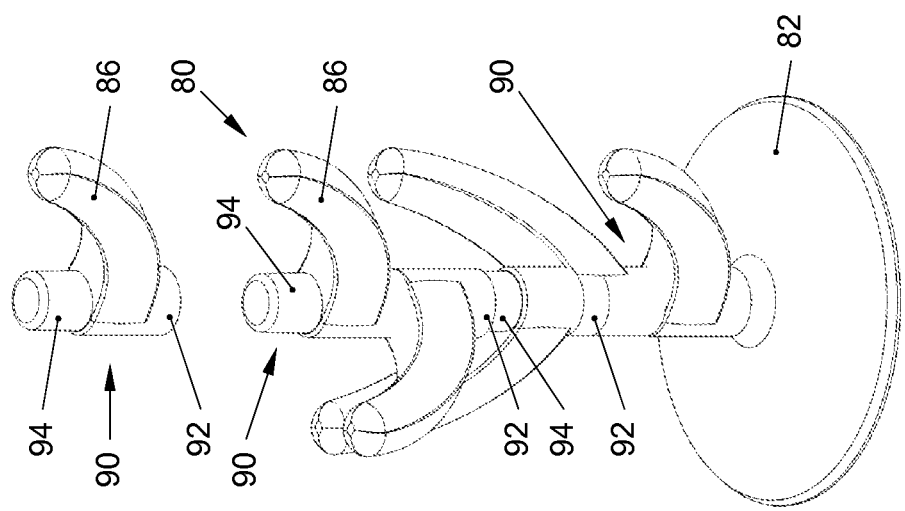
FIG. 12 shows a schematic perspective exploded view of the holder of FIG. 11
Figure 11:
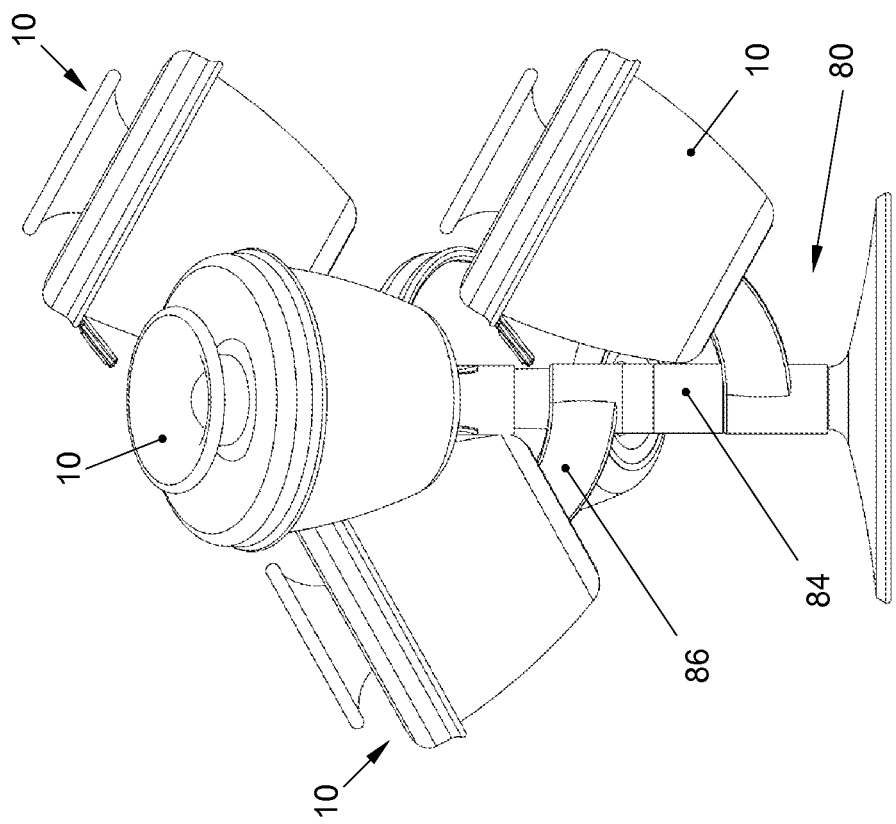
FIG. 11 shows a schematic perspective front view of a holder assembly according to the invention.

FIG. 11 shows dispensing assemblies 10 that are arranged on a holder 80. FIG. 12 shows an exploded view of the holder 80. Such an arrangement of dispensing assemblies 10 and a holder 80 may e.g. be used as a herb rack wherein herbs or other goods can be contained in the receptacle 20. By providing a holder, a simple and easy storage can be provided for the dispensing assemblies.

The holder 80 comprises a holder foot 82 on which a holder base 84 comprising holder arms 86 is provided. In this embodiment, the holder foot 82 is provided with a single holder base 84 protruding from the holder foot 82. However, the holder foot 82 may comprise multiple holder bases 84, which may or may not comprise holder arms.

In the embodiment shown in FIG. 12, the holder 80 is modular comprising multiple holder elements 90. A holder element 90 can comprise a single or multiple holder arms 86. Each holder element 90 comprises a first cooperating element 92 and a second cooperating element 94. The first cooperating element 92 is arranged for cooperation with a second cooperating element 94 of another holder element 90. This way a modular holder 80 can be formed that can be adapted to the user's needs. The first and second cooperating elements 92, 94 are here arranged as a protrusion 94 that can be received in a opening 92. Other cooperating elements can be provided, e.g. with a click or snap connection, or a screw connection. Many variants are possible. Here the protrusion 94 falls approximately loosely in the opening 92.

The holder arm 86 is arranged for cooperation with a pillar 26 of the receptacle 20. The pillar 26 is hollow for receiving the holder arm 86. The pillar 26 is preferably tapering towards it's blunt upper end, and the holder arm 86 may be tapered correspondingly. The pillar 26 is approximately upwardly arranged in the receptacle 20. As can be seen in FIG. 12, the holder arm 86 may be straight or curved.

In other embodiments, the closure member 40 need not close off the bowl in an air-tight manner. For example, where the primary intended food product is nuts that are still encased in their shells or individually wrapped sweets, non-air-tight seals will suffice. In such cases, the assembly 10 may still provide an aesthetically-pleasing storage place for the nuts or sweets and a convenient means of dispensing the nuts or sweets.

In other embodiments, the receptacle in which the food or drink product is held need not be bowl shaped.

Many variants will be apparent to the person skilled in the art. All variants are understood to be comprised within the scope of the invention as defined in the following claims.

The invention claimed is:

1. A dispensing assembly for food or drink products, comprising:

a receptacle for accommodating a food or drink product, comprising an opening; and a closure member for closing the opening, the closure member being mounted across the opening and having at least one outlet, and a stop member mounted to confront the outlet, the closure member being resiliently deformable, wherein the closure member is adjustable, by the pressing action of a user, from a first condition in which the outlet is open by being spaced from the stop member to allow the food or drink product to pass through the outlet to a second condition in which the outlet has been moved inwardly to a position in which it is closed off by the stop member, wherein the closure member is entirely resiliently deformable and has an inward facing surface that in the first condition is convex leading upwardly from an edge of the receptacle forming the opening, wherein the inward facing surface in the second condition is concave leading upwardly from the edge of the receptacle and smoothly transitions downwardly into a convex shape leading to the stop member such that the inward facing surface is deformed without the-presence of a predetermined deformation line.

2. An assembly as in claim 1, wherein the closure member further is adjustable to an intermediate condition in which the outlet partly is moved towards the stop member wherein the outlet is partly closed off by the stop member.

3. An assembly according to claim 2, wherein in the intermediate condition, the closure member is an oblique position with respect to the first condition or the second condition.

4. An assembly as in claim 1, wherein the stop member forms part of a stop member assembly, that is fittable to the receptacle.

5. An assembly as in claim 4, wherein the stop member assembly further comprises a framework by which the stop member is suspended in confrontation with the outlet.

6. An assembly as in claim 5, wherein the stop member assembly comprises as a stop member a pillar projecting upwardly from a base of the receptacle.

7. An assembly as in claim 6, wherein the pillar is integrated to the receptacle.

8. An assembly as in claim 1, wherein the receptacle is arranged for cooperation with a holder.

9. An assembly as in claim 6, wherein the pillar is hollow for receiving a holder arm.

10. An assembly as in claim 1, wherein the outlet comprises an outlet channel defined by a channel wall portion.

11. An assembly as in claim 10, wherein the channel wall portion flares outwardly.

12. An assembly as in claim 1, wherein the outlet comprises a flange that engages with the stop member when the closure member is in the second condition.

13. An assembly as in claim 12, wherein the outlet channel comprises the flange.

14. An assembly as in claim 1, wherein the receptacle comprises a bowl.

15. An assembly according to claim 1, wherein the closure member can be pressed towards the second condition, such that during use air may escape the receptacle, wherein due to the resiliently deformable closure member a slight underpressure results in the receptacle.

* * * * *